(12) United States Patent
Como et al.

(10) Patent No.: US 7,809,600 B1
(45) Date of Patent: Oct. 5, 2010

(54) METHOD AND SYSTEM FOR BUSINESS PLANNING VIA A COMMUNICATIONS NETWORK

(75) Inventors: Gary Como, Avon Lake, OH (US); Sheryl L. Gast-Graham, Avon, OH (US); Doug Grimm, Bay Village, OH (US); Barry Smiach, Independence, OH (US); Arnold Z. Huffman, Chicago, IL (US); Richard R. Krahn, North Lake Elmo, MN (US); John Mitchell, Tampa, FL (US); Michael S. Sweeney, Parma Heights, OH (US)

(73) Assignee: Accenture LLP, San Jose, CA (US)

( * ) Notice: Subject to any disclaimer, the term of this patent is extended or adjusted under 35 U.S.C. 154(b) by 2163 days.

(21) Appl. No.: 09/710,154

(22) Filed: Nov. 9, 2000
(Under 37 CFR 1.47)

(51) Int. Cl.
*G06Q 99/00* (2006.01)
(52) U.S. Cl. .................. 705/10; 705/7; 705/1
(58) Field of Classification Search .......... 705/10, 705/7, 1
See application file for complete search history.

(56) References Cited

U.S. PATENT DOCUMENTS

| | | | |
|---|---|---|---|
| 5,893,076 A * | 4/1999 | Hafner et al. | 705/28 |
| 5,953,707 A * | 9/1999 | Huang et al. | 705/10 |
| 5,974,395 A | 10/1999 | Bellini et al. | 705/9 |
| 5,983,202 A | 11/1999 | Yabe et al. | 705/28 |
| 6,012,041 A * | 1/2000 | Brewer et al. | 705/28 |
| 6,115,690 A * | 9/2000 | Wong | 705/7 |
| 6,125,391 A * | 9/2000 | Meltzer et al. | 709/223 |
| 6,226,675 B1 * | 5/2001 | Meltzer et al. | 709/223 |
| 6,249,774 B1 * | 6/2001 | Roden et al. | 705/28 |
| 6,253,187 B1 * | 6/2001 | Fox | 705/10 |
| 6,341,271 B1 * | 1/2002 | Salvo et al. | 705/28 |
| 6,345,259 B1 * | 2/2002 | Sandoval | 705/7 |

(Continued)

FOREIGN PATENT DOCUMENTS

WO    WO 00/29999    5/2000

OTHER PUBLICATIONS

"Butler Group—E-Business," published by Butler Direct Limited, vol. 2, Apr. 1999, pp. 31-33.

(Continued)

*Primary Examiner*—Akiba K Robinson Boyce
(74) *Attorney, Agent, or Firm*—Brinks Hofer Gilson & Lione (57) ABSTRACT

A method and system for business planning via a communications network includes automated electronic communication procedures for managing the exchange of goods, services, or materials among different business entities. Requirement-indicating data is obtained from a first entity with respect to a transactional subject. The transactional subject may refer to the provision of a material, a good, a service, or any combination of the foregoing items. The obtained requirement-indicating data is automatically transmitted from the first business entity to a second business entity over a communications network. The transmitted requirement-indicating data is automatically fed into an electronic processor associated with the second business entity. A business decision of the second business entity is generated based on the requirement-indicating data. Accordingly, the method and system facilitates the exchange of accurate and timely business information between the first entity and the second entity by reducing or eliminating manual clerical tasks.

40 Claims, 7 Drawing Sheets

U.S. PATENT DOCUMENTS

| | | | |
|---|---|---|---|
| 6,418,448 B1 * | 7/2002 | Sarkar | 707/104.1 |
| 6,606,603 B1 * | 8/2003 | Joseph et al. | 705/26 |
| 6,640,249 B1 * | 10/2003 | Bowman-Amuah | 709/228 |
| 6,789,252 B1 * | 9/2004 | Burke et al. | 717/100 |
| 6,834,285 B1 * | 12/2004 | Boris et al. | 707/103 R |
| 6,871,187 B1 * | 3/2005 | Gosko | 705/26 |
| 6,971,096 B1 * | 11/2005 | Ankireddipally et al. | 718/101 |
| 6,986,104 B2 * | 1/2006 | Green et al. | 715/523 |
| 6,996,538 B2 * | 2/2006 | Lucas | 705/28 |
| 2001/0034673 A1 * | 10/2001 | Yang et al. | 705/28 |
| 2001/0037259 A1 * | 11/2001 | Sharma et al. | 705/26 |
| 2002/0120519 A1 * | 8/2002 | Martin et al. | 705/21 |
| 2002/0128921 A1 * | 9/2002 | Tarr | 705/26 |
| 2002/0165872 A1 * | 11/2002 | Meltzer et al. | 707/500 |
| 2003/0040935 A1 * | 2/2003 | Magee | 705/1 |
| 2004/0181493 A1 * | 9/2004 | Cross et al. | 705/75 |
| 2005/0149489 A1 * | 7/2005 | Abjanic et al. | 707/1 |
| 2005/0265315 A1 * | 12/2005 | Edgar | 370/352 |
| 2006/0100889 A1 * | 5/2006 | Gosko | 705/1 |
| 2006/0100937 A1 * | 5/2006 | Lucas | 705/26 |

OTHER PUBLICATIONS

Min et al., "An /Integrated Decision Support System for Global Logistics," International Journal of Physical Distribution & Logistics Management, vol. 24, No. 1, available at http://cstl-hcb.semo.edu/eom/research/dsslogistics.pdf as of Apr. 15, 2009, 1994, pp. 29-39.

* cited by examiner

METHOD AND SYSTEM FOR BUSINESS PLANNING VIA A COMMUNICATIONS NETWORK

FIELD OF THE INVENTION

This invention relates to a method and system for business planning via a communications network.

BACKGROUND OF THE INVENTION

Enterprise resource planning (ERP) systems include a computer and software instructions for supporting or managing at least one business activity. For example, in the context of a manufacturing corporation, an enterprise resource planning system may integrate engineering, sales, materials management production planning and accounting functions of the manufacturing corporation.

If a business relationship exists between business entities, the business entities need to exchange information in some manner to conduct one or more transactions. Numerous technical obstacles may arise in providing electronic communications between the ERP systems of different business entities to reduce transactional costs. For instance, many ERP systems were designed only to handle the flow of data from internal data sources. Data from external sources, such as other business entities, may require translation and additional data processing to achieve interoperability between the ERP systems of different business entities. Thus, a need exists for facilitating communications between an enterprise resource planning system of a first company and an enterprise resource planning system of a second entity where the first entity and the second entity have a business relationship.

Because of the aforementioned technical obstacles in establishing a reliable communications link between the first ERP system and the second ERP system, business entities may adopt manual data entry processes as an alternative business procedure. However, exchanging information between a first ERP system and a second ERP system using manual data entry processes is often slow and error prone. For example, a manual data entry process may involve a clerical worker that reads a cathode-ray-tube monitor of a source ERP system to gather critical data for a transaction. The clerical worker may fax, e-mail, or mail the critical data to a second business entity. At the second business entity, another clerical worker may sort and sift through relevant information provided and enter the relevant information via a keyboard into the destination ERP system.

The extraction of data from the source ERP system is prone to human error and delays inherent with human workers. For example, a worker may misread a cathode-ray-tube monitor or be distracted so that inaccurate data is extracted from the source ERP system. Similarly, the extraction of erroneous data from the source ERP system may result in typographical errors if the clerical worker enters data in a word processing document, a spreadsheet or some other format in preparation for sending the critical information to the destination ERP system. The manual entry process at the destination ERP system is subject to similar miscues and errors to the entry process at the source ERP system. Moreover, delays in the entry or extraction of data at either business entity may result from inattentiveness of a worker, a worker on vacation, a worker on sick leave, or other responsibilities of a worker that conflict with the worker's duty to extract or enter the data. Accordingly, the business planning of first business entity associated with the destination ERP system will experience a delay and potential inaccuracies from human intervention. In turn, the second business entity associated with the source ERP system may be impacted because of the business relationship between the first business entity and the second business entity results in mutual problems.

The problems that arise from deficient communications are readily apparent where the first and second business entities have a customer-supplier relationship. For example, if the first business entity represents a customer that provides source data to the second business entity as a supplier, then the supplier may receive inaccurate or outdated forecasts as the source data. The inaccurate or outdated forecast may result in errors in production quantities, capital expenditures, hiring, or any other business planning aspect. Moreover, a customer may be reluctant to conduct future business with a supplier that fails to provide timely delivery of a product because of the depletion of the supplier's inventory resulting from an inaccurate or outdated forecast. Thus, a need exists to improve the timeliness and accuracy of the transfer of information from a first ERP system to a second ERP system or among analogous electronic processing systems at different business entities.

BRIEF SUMMARY OF THE INVENTION

In accordance with the invention, a method and system for business planning via a communications network includes automated electronic communication procedures for managing commercial activity or a transaction between different business entities. Requirement-indicating data is obtained from a first entity with respect to a transactional subject. The transactional subject may refer to the provision of a material, a good, a product, a service, a financial transaction, or any combination of the foregoing items. The obtained requirement-indicating data is automatically transmitted from the first business entity to a second business entity over a communications network. The transmitted requirement-indicating data is automatically fed into an electronic processor associated with the second business entity. A business decision of the first business entity, the second business entity, or both is generated based on the requirement-indicating data. Accordingly, the method and system facilitates the exchange of accurate and timely business information between the first entity and the second entity by reducing or eliminating manual clerical tasks that might otherwise be interpreted as intermediate steps in the foregoing method.

DETAILED DESCRIPTION OF THE PREFERRED EMBODIMENTS

Figure 1:
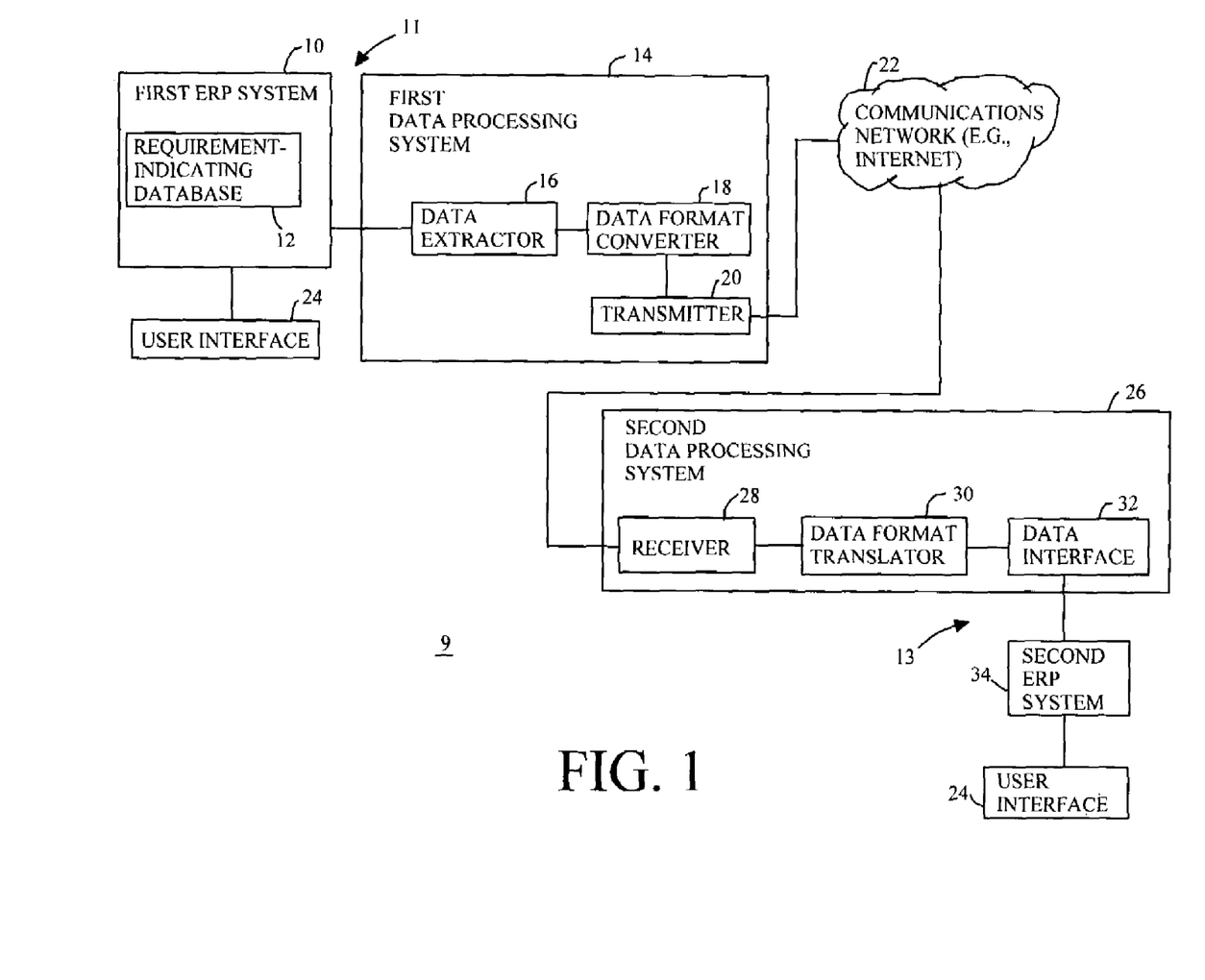
FIG. 1 is a block diagram of a system for business planning via a communications network in accordance with the invention.

In accordance with the invention, FIG. 1 illustrates a system 9 for business planning that facilitates efficient communications and the exchange of information between a first data management system 11 affiliated with a first business entity and a second data management system 13 affiliated with a second business entity. As shown in FIG. 1, the first management system 11 includes a first enterprise resource planning (ERP) system 10 and a first data processing system 14. The second data management system 13 includes a second enterprise resource planning system 34 and the second data processing system 26. The first and second data management systems (11, 13) communicate via a communications network 22 (e.g., Internet).

The first ERP system 10 is coupled to the first data processing system 14. In turn, the first data processing system 14 is arranged to communicate via the communications network 22. The communications network 22 is arranged to communicate with the second data processing system 26. The second data processing system 26 is coupled to the second ERP system 34. The first ERP system 10, the second ERP system 34, or both include a user interface 24 for presenting data associated with the respective ERP systems.

In the example of FIG. 1, the first ERP system 10 may be regarded as a data source and the second ERP system 34 may be regarded as a data destination. However, in one alternative embodiment the second ERP system 34 may represent the source and the first ERP system 10 may represent the destination. In another alternative embodiment, the exchange of data between the first ERP system 10 and the second ERP system 34 may be a bi-directional exchange of data.

The first ERP system 10 includes a requirement-indicating database 12. The requirement-indicating database 12 provides requirement data on a transactional subject. The transactional subject may refer to the provision of a material, a good, a product, a service, a financial transaction, or any combination of the foregoing items. Requirement data refers to information that is useful in managing or conducting a commercial activity or a transaction involving a transactional subject. For example, the requirement data may be used to make one or more business decisions (e.g., materials management decisions) related to the transactional subject. Although the first ERP system 10 may establish the requirement-indicating database 12 as part of the normal operation of the first ERP system 10, in an alternative embodiment the first data processing system 14 may establish a requirement-indicating database 12 for storage in the first ERP system 10, in the first data processing system 14, or elsewhere by gathering and filtering raw data within the first ERP system 10.

The first data processing system 14 includes a data extractor 16, a data format converter 18, and a transmitter 20. A data extractor 16 extracts relevant data from the requirement-indicating database 12. The data extractor 16 communicates the extracted data with a data format converter 18. In turn, the data format converter 18 communicates with the transmitter 20. The data extractor 16 and the data format converter 18 may represent software instructions. The transmitter 20 may represent a portion of a transceiver adapted to transmit to the receiver 28 via the communications network 22. In FIG. 1, the lines interconnecting the data extractor 16, the data format converter 18 and the transmitter 20 may indicate logical relationships, physical electrical interconnections, or both among the various components of the first data processing system 14.

The data extractor 16 includes an extraction algorithm that mines relevant requirement data from the requirement-indicating database 12. Relevant requirement data is pertinent to the transactional subject, the relationship between the first business entity and the second business entity, or both. The relevance of the requirement data may be determined in accordance with one of several alternative techniques. In accordance with a first technique, the extracted relevant data is commensurate in scope with the input information that the second ERP system 34 is designed to accept or capable of accepting. In accordance with a second technique, subsequent extracted relevant data is based on previous history of the necessity or usefulness of prior extracted relevant data for managing the commercial activity and transactional subject in the desired manner. In accordance with a third technique, the relevance is based on an economic model or an empirically based model for managing the commercial activity or the transactional subject in a desired manner.

The extractor 16 may comprise a filter that filters the requirement data in the requirement-indicating database 12 to obtain extracted relevant data. The data extractor 16 references a relevant list of relevant data fields or relevant data entries within the requirement-indicating database 12. Data fields or data entries that are not listed on the relevant list are ignored, rather than being extracted. The relevant entries may be defined in terms of storage addresses, variable names, filenames, or otherwise. Consistent with one of the foregoing techniques for determining the relevance of data within the requirement-indicating database 12, a software designer or programmer may establish the relevant list to select which field identifiers and data entries are ignored and which are not.

The data format converter 18 accepts the extracted requirement data and formats the extracted requirement data into a suitable data structure for transmission over the communications system 22 to the second data processing system 26. For instance, the data format converter 18 accepts the extracted requirement data and formats the extracted requirement data into one or more extensible mark-up (XML) files.

An extensible mark-up file represents a text file that stores structured data. Because the format of XML is stored as a text file, a program administrator may view the file in a text editor, for example. XML provides a set of rules and guidelines for designing a text format that can be interpreted consistently among different computer systems and platforms. Thus, the user of XML may enhance the scope of interoperability between or among different data management systems of various business entities.

The transmitter 20 accepts the formatted requirement data (e.g., at least one XML file) from the data format converter 18. The transmitter 20 places the formatted requirement data in a suitable physical form for communication over the communications network 22. The transmitter 20 may comprise a portion of a transceiver, such as a data packet transceiver or a modem. In one example, the transmitter 20 packetizes the formatted requirement data into data packets, such as Internet-protocol (IP) data packets or asynchronous transfer mode (ATM) packets for transmission over the communications network 22. In another example, where the communications network 22 represents a public switched telephone network (PSTN), the transmitter 20 may represent a modem for encoding the XML file as tone signals or digital signals for transmission over the communications network 22.

The communications network 22 may represent the Internet, an intranet, a public switched telephone network (PSTN), a dedicated private line, or any other communications network.

The second data processing system 26 has a receiver 28 that receives the data transmission (e.g., at least one XML file) in the physical form transmitted by the transmitter 20.

The receiver 28 may represent a portion of a transceiver, such as a data packet transceiver or a modem.

In one example, the receiver 28 may convert Internet-protocol (IP) data packets or asynchronous transfer mode (ATM) data packets to reconstruct the transmitted XML file or files. Data packets are assembled and may need to be de-interleaved during such a process. In another example, where the communications network 22 comprises the public switched telephone network, the receiver 28 represents a modem capable of demodulating a transmission from a transmitter 20 that is a modem.

The data format translator 30 is adapted to translate the received data (e.g., XML file or files) into a structured data format that is compatible with the second ERP system 34. The data format translator 30 generally represents the inverse operation of the data format converter 18. The data format converter 18, the data format translator 30, or both may be based on commercially available software packages that translate structured data into XML documents. For example, the data format converter 18 and the data format translator 30 may represent software instructions that are available from webMethods of Fairfax, Va. The data format translator 30 is coupled to the data interface 32.

The data interface 32 preferably includes a memory buffer for holding structured data for submission to the second ERP system 34 consistent with the ability of the second ERP system 34 to accept such structured data. The data interface 32 may also include a transmission interface that places the structured data into a suitable format such as a suitable optical or physical connector standard for interfacing the second data processing system 26 with the second ERP system 34.

One or more user interfaces 24 are coupled to the first ERP system 10, the second ERP system 34, or both. The user interface 24 may comprise a monitor for displaying source data of the first ERP system 10 or destination data of the second ERP system 34. Although the source data and the destination data are preferably equivalent, the display and presentation of such information to the first business entity and second business entity promotes useful dialog, cross-checking, and problem resolution between the business entities. The user interface 24 promotes the ability to check for errors and readily check on the status of the business relationship.

The system of FIG. 1 supports accurate communications between the first ERP system 10 and the second ERP system 34 with the first data processing system 14 and the second data processing system 26 acting as data processing intermediaries. The first data processing system 14 and the second data processing system 26 automate the extraction of data from the first ERP system 10 and the loading of data into the second ERP system 34, respectively. The system removes some manual data processing aspects from business planning, which may increase the accuracy and speed with which business planning decisions are made. In practice, the system may be used to promote cost reduction associated with inventory management, consignment management, customer-supplier relationships, or other business contexts.

Figure 2:
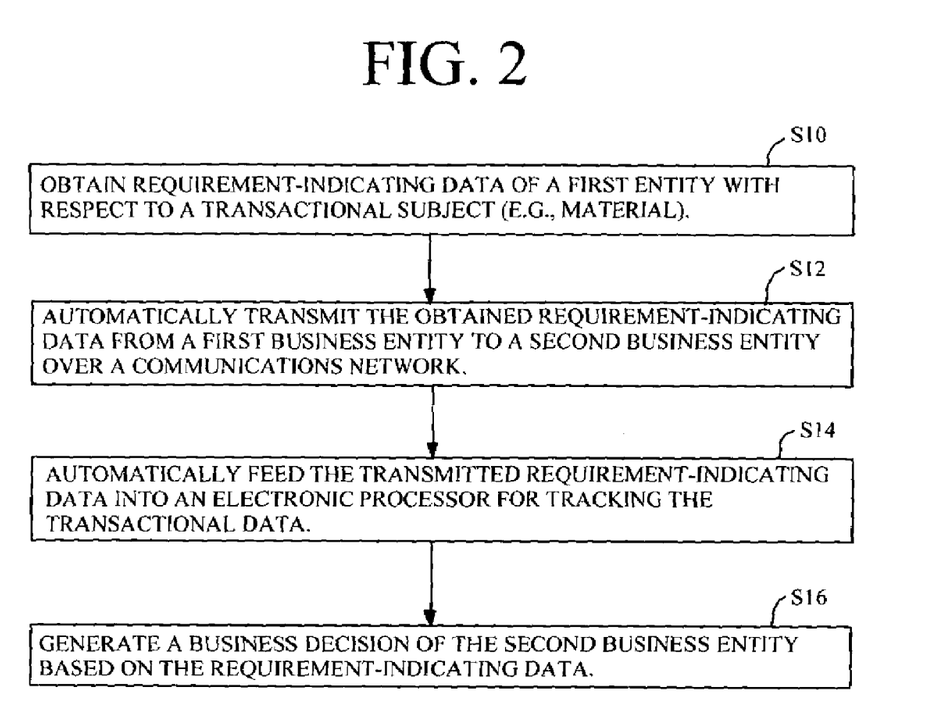
FIG. 2 is a flow chart of a method for business planning in accordance with the invention.

FIG. 2 illustrates a method for business planning in accordance with the invention. FIG. 2 may be implemented in a manner consistent with the system of FIG. 1. In one example, a first entity may represent a business entity, which is a customer of a second business entity. Accordingly, the second business entity may be considered a supplier to the first business entity. The method of FIG. 2 starts in step S10.

In step S10, a first data processing system 14 obtains requirement-indicating data of the first entity with respect to a transactional subject. The transactional subject refers to a good, service, product, material, financial transaction, or any combination of the foregoing items. The requirement-indicating data may represent forecast data, demand data, consumption data, inventory data, or any other data that impacts characteristics of a transaction or commercial activity involving the transactional subject. The forecast data may represent a prospective or predicted demand for a transactional subject. In comparison, the demand data may show an actual or present demand for a material, good, product, financial transaction, or service. The inventory data represents a measure of an inventory level of a transactional subject. The consumption data represent an increase, a decrease, rate of increase, or rate of decrease of inventory of a transactional subject.

In one embodiment, step S10 includes extracting a subset of the requirement-indicating data from the requirement-indicating database 12 associated with the first ERP system 10. In general, the first data processing system 14 extracts the extracted requirement-indicating data based on its relevance to the transactional subject or the associated commercial activity. The extracted requirement-indicating data may be extracted based on its usefulness for computations of the second ERP system 34.

In step S12, following step S10, the first data processing system 14 automatically transmits the obtained requirement-indicating data from a first business entity to a second business entity over a communications network 22. As used herein, automatically refers to an electronic action that supports interoperability and communication between different electronic processors (e.g., ERP systems) associated with distinct business entities, where the electronic action is completed with minimal or no human intervention.

The first data processing system 14 preferably transmits the obtained requirement-indicating data with minimal or no human intervention, such as a worker generating an e-mail, a facsimile document, a letter, or another communication. The minimal human intervention tends to reduce errors and time delays that might be otherwise associated with the communications between the business entities via the communications network 22.

In one example, the communications network 22 comprises the Internet. The first data processing system 14 may access the Internet as a communications network 22 via the public switched telephone network. In an alternative example, the communications network 22 comprises a public switched telephone network, an intranet, or any other communications network 22.

Accordingly, step S12 may involve the first data processing system 14 transmitting asynchronous transfer mode data packets (ATM) or Internet-protocol (IP) data packets from a first site to a second data processing system 26 at a second site. The first site is associated with the first business entity and the second site is associated with the second business entity.

In one embodiment, the first data processing system 14 may transmit the requirement-indicating data on an as-needed or differential basis with respect to previous transmission to reduce the necessary bandwidth or transmission duration for communications between the first business entity and the second business entity. Further, the as-needed transmission of the requirement-indicating data may reduce the processing capacity and resources or increase the data throughput of the first data processing system 14 and the second data processing system 26. An as-needed transmission involves (1) transmitting superseding data to replace prior requirement-indicating data only where prior requirement-indicating data is outdated (e.g., changed in a material manner) or (2) transmitting differential data that expresses a change (e.g., a material change) with respect to the prior requirement-indicating data. Accordingly, if no change (or little change) occurs in the previous requirement-indicating data during a time interval, nothing (or little) may be transmitted in the as-needed transmission for the time interval. For example, upon the passage of each successive interval for updating the requirement-indicating data, the first business entity may transmit as little as a revised quantity and a corresponding transactional subject identifier for any transactional subject that has changed with respect to prior requirement-indicating data of a prior reference time (e.g., last update interval). Similarly, the requirement-indicating data may transmit as little as a revised price and a corresponding transactional subject identifier where the market for the transactional subject results in fluctuations in the price of the transactional subject, but no other changes in the requirement-indicating data.

In step S14, the second data processing system 26 receives the transmission from the first data processing system 14 via the communications network 22. Further, the second data processing system 26 automatically feeds the received requirement indicating data into an electronic processor for tracking the transactional data. For example, the transactional processor may represent the second ERP system 34 of the second business entity.

In one embodiment, the second data processing system 26 feeds the received requirement-indicating data into the second ERP system 34 with minimal or no human intervention to facilitate reduced transaction cycle time and greater accuracy in the commercial activity concerning the transactional subject. Step S14 may include the second data processing system 26 translating the data format of the received requirement-indicating data into a suitable format compatible with the second ERP system 34. For example, the second data processing system 26 may translate received requirement-indicating data in the extensible mark-up language format to a data structure compatible with the second ERP system 34.

In step S16, the second data processing system 26 generates or facilitates the generation of a business decision of the first business entity, the second business entity, or both based on the requirement-indicating data. The business decision generally includes an order processing decision, a logistic decision, or both. An order processing decision involves an automated or human decision to purchase a transactional subject, engage in a commercial transaction, order a transactional subject based on the requirement-indicating data, or any combination of the foregoing. A logistic decision impacts how, when, and where the order processing characteristics are executed. That is, the logistics decision may form the basis for an input to the order processing system, a contractual agreement, or some other business action plan. A logistics decision may include determining a shipping instruction for the transactional subject based on the requirement-indicating data.

The generation of a business decision may further include ministerial or administrative tasks, such as confirming orders and confirming shipment parameters. Shipping parameters include the delivery terms, the destination terms, the identification of a shipper, the provision of freight insurance, or other aspects that are customary in the shipment of good and products.

One example of an order processing decision, is the procurement of production material for a manufacturing concern as the business entity. Another example of a business decision is adjusting a production rate of a product based on the requirement indicating data. Another example of a business decision is decreasing or increasing the stock of a raw material based on the requirement indicating data. Yet another business decision may include hiring or firing of workers in a manufacturing concern or capital expenditures for production equipment or the like.

The foregoing method and system promotes business decisions that are based upon accurate and timely requirement-indicating data. The enhanced accuracy of the requirement-indicating data is realized through the elimination of manual data extraction and manual data entry. The accuracy in the communications of data between a first ERP system 10 and a second ERP system 34 or an electronic processor for tracking transactional data may facilitate inventory reduction or the maintenance of a desired level of inventory.

The accuracy of the business decision generated may be enhanced by exchanging requirement-indicating data between the first business entity and the second business entity at generally regular intervals (e.g., daily) of sufficiently short durations. The regular interval defines a duration between potential or actual updating of the requirement-indicating data between the first business entity and the second business entity. The regular interval may depend upon the nature of the business of the first business entity, the second business entity, or both. For example, if, during a regular interval, the requirement-indicating data fluctuates by more than a reasonable threshold, which is consistent with the business objectives of the first business entity and the second business entity, the first business entity and the second business entity may agree to shorten the regular interval (e.g., duration between updates of the requirement-indicating data).

In one embodiment, if the requirement-indicating data is used for inventory control and management of the transactional subject, the requirement-indicating data is based on no greater update interval than on a daily basis. Further, for advanced planning, the requirement indicating data may include forecast for a future time period (e.g., monthly or 30 day period) for the transactional subject matter. For instance, a monthly forecast may be established for the present month, extending out on a monthly basis over the next year or another suitable long-term period (e.g., 400 days). If the transactional subject is a chemical, a compound, or another commodity, the forecast may be sufficiently reliable for the first business entity, the second business entity, or both to make valid business decisions. For example, the supplier may procure a sufficient supply of the transactional subject by following the forecast with consideration of one or more of the following factors for verification of the forecast: historical production capacity of the supplier, actual production capacity of the supplier, historical usage of the transactional subject by the customer, and historical consumption of the transactional subject by the customer. If the supplier follows a just-in-time production philosophy to minimize inventory of the transactional subject, the forecast may facilitate meeting timely deliveries of the transactional subject to the customer. Accordingly, the supplier may follow the requirement-indicating data of the forecast to limit or prevent the accumulation of excess inventory of the transactional subject.

Although the method supports the exchange of accurate information between a first ERP system 10 and a second ERP system 34, the ERP systems may be replaced with an electronic processor for supporting a business activity. The electronic processor may perform a limited business function such as storing ordering information or storing delivery information. For example, the first ERP system 10 may be replaced with a purchase order generation system and the second ERP system 34 may be replaced by an order tracking system or delivery tracking system.

Figure 3:
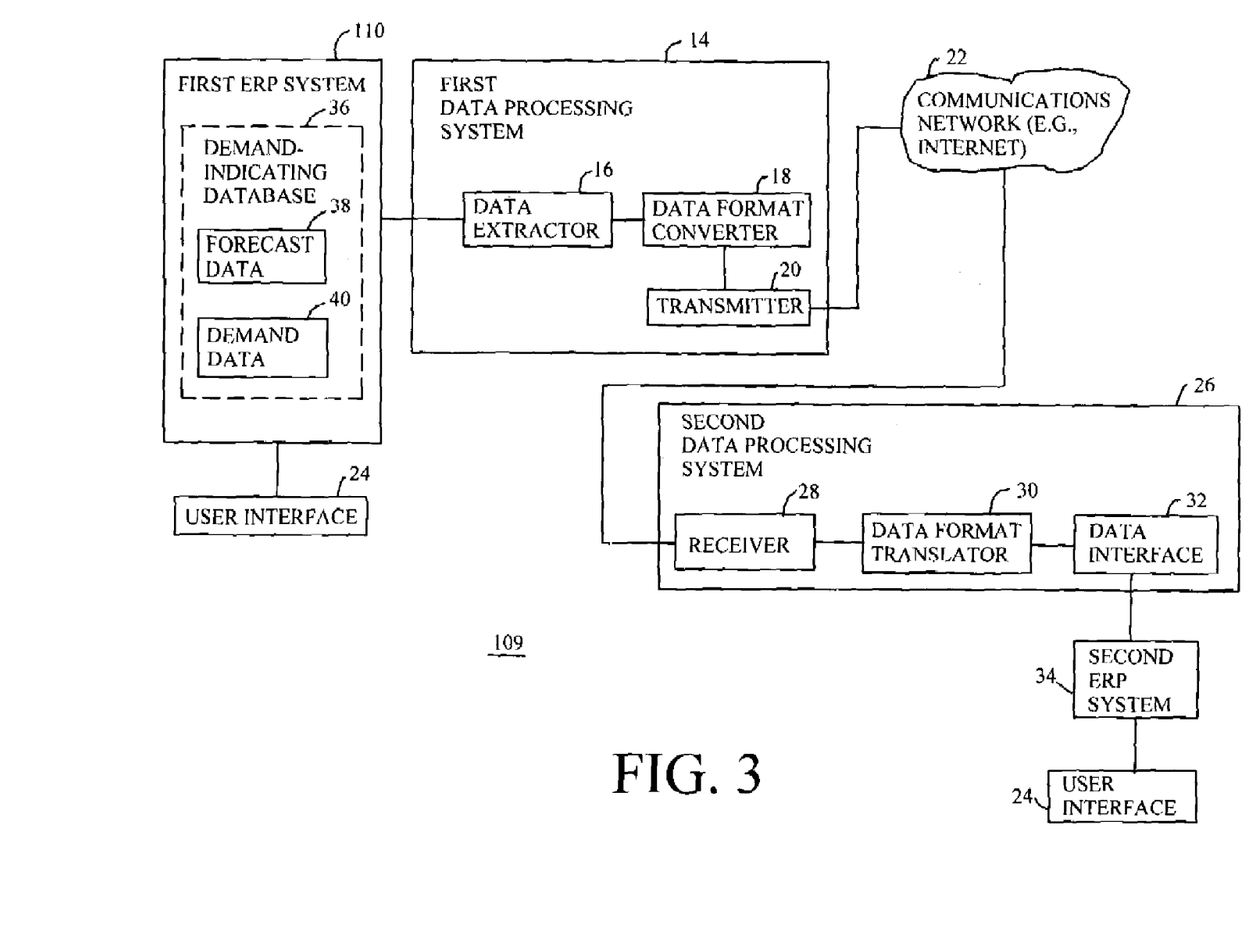
FIG. 3 is a flow chart of another embodiment of a system for a business planning via a communications network in accordance with the invention.

FIG. 3 shows a block diagram of an embodiment of the system 109 for business planning, which is similar to that of FIG. 1, except FIG. 3 includes a demand-indicating database 36, instead of a requirement-indicating database 12. Like reference numbers indicate like elements in FIG. 1 and FIG. 3.

The demand-indicating database 36 of FIG. 3 may represent one possible example of a requirement-indicating database 12 of FIG. 1. As shown in FIG. 3, the demand-indicating database 36 includes forecast data 38 and demand data 40. If the first business entity represent a customer and the second business entity represents a supplier of the customer, then the forecast data 38 represents the prospective demand of the first business entity for a product, service, good, financial transaction, or material provided by the second business entity. Similarly, the demand data 40 represents an actual, a present, or an estimated demand for a good, service, product, material, or financial transaction provided by the second business entity to the first business entity. The first ERP system 110 may update the demand-indicating database on a periodic basis. For example, the first ERP system 110 may update the demand-indicating database on a daily basis after the end of a business day and prior to a beginning of a next successive business day. The updates to the demand-indicating database are used to adjust the demand data 40 and the forecast data 38 to reflect current or actual conditions.

The first data processing system 14 cooperates with the communications network 22 and the second data processing system 26 to assure the accurate transmission of the forecast data 38 from the source or first ERP system 110 to the destination or second ERP system 34. Accordingly, distortions and potential inaccuracies in the data from manual data extraction from the first ERP system 110 and manual data entry into the second ERP system 34 are eliminated. Thus, the second business entity is presented with more accurate forecast data 38 and more accurate demand data than would otherwise be possible with manual data extraction and data entry associated with the ERP systems (110, 34).

Figure 4:
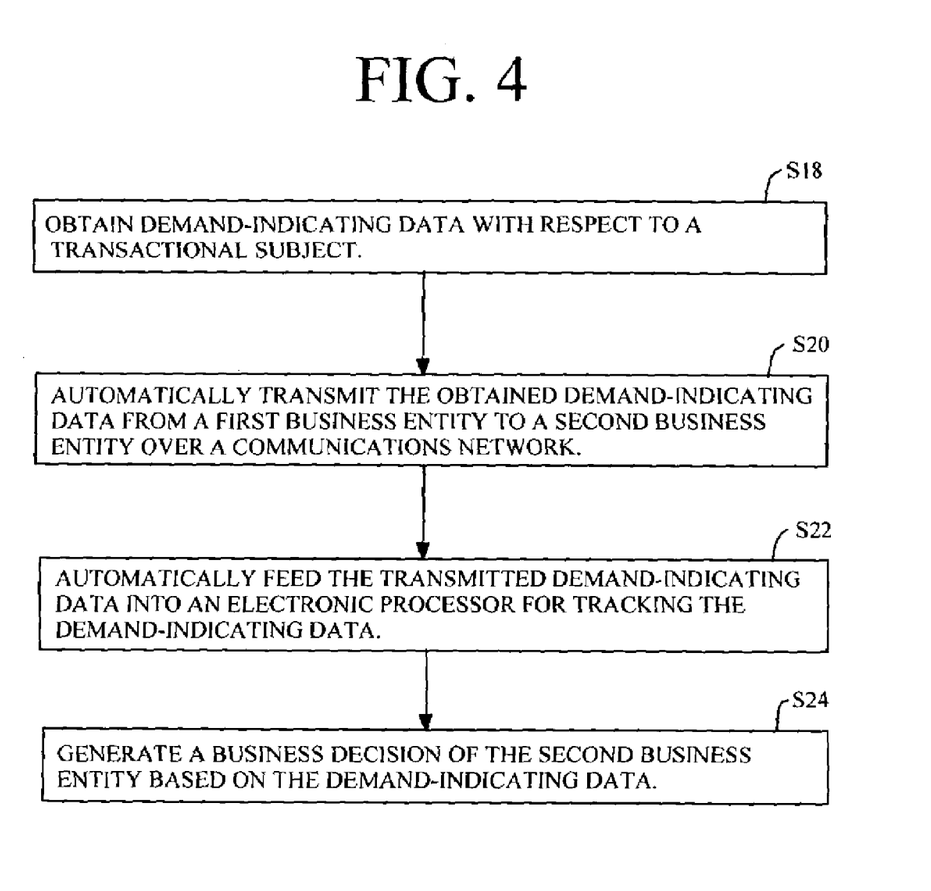
FIG. 4 is a flow chart of a method for business planning consistent with FIG. 3.

FIG. 4 shows a method for automated business planning consistent with the system 109 of FIG. 3. The method of FIG. 4 begins with step S18.

In step S18, the first data processing system 14 accesses demand-indicating data within a demand-indicating database 36 associated with a first ERP system 110. Further, the first data processing system 14 extracts a relevant portion of the demand-indicating data with respect to a transactional subject (e.g. material). The relevant portion is a subset of the demand-indicating data, which is essential or appropriate for computations of the second ERP system 34.

The demand-indicating data refers to forecast data 38, demand data 40, or both. The first ERP system 110 may update the demand-indicating data in the demand-indicating database 36 on a periodic basis to promote accuracy and currency of the demand-indicating data. For example, the first ERP system 110 may update the demand-indicating data in the demand-indicating database 36 on a daily basis after an end of a business day and prior to a beginning of a next successive business day.

In one embodiment, the first data processing system 14 formats the relevant portion of the demand-indicating data into an extensible mark-up language document in preparation for transmission via the communications network 22.

After step S18 in step S20, a first data processing system 14 automatically transmits the obtained demand-indicating data from a first business entity to a second business entity over the communications network 22. For example, the first processing system 14 may transmit the demand-indicating data in the database on a daily basis after an end of a business day and prior to a beginning of a next successive business day. In one embodiment, the first data processing system 14 may transmit an extensible mark-up language document as the demand-indicating data over the communications network 22.

In step S22 following step S20, the second data processing system 26 receives the demand indicating data that was transmitted in step S20. The second data processing system 26 automatically feeds the transmitted demand-indicating data into an electronic processor for tracking the demand-indicating data. For example, the electronic processor may represent the second ERP system 34.

If the received demand-indicating data is an extensible mark-up language document, the second data processing system 26 translates the extensible mark-up language document into a data format compatible with the second ERP system 34 or another electronic processor.

In step S24, after step S22, the electronic processor (e.g., second ERP system 34) generates a business decision or facilitates the generation of a business decision of the second business entity based on the demand-indicating data. For example, the first ERP system 110, the second ERP system 34, or both may display demand-indicating data or a proposed commercial transaction on a user interface to assist a user in making a business decision.

If the first business entity represents a customer of the transactional subject and a second business entity represents a supplier of the transactional subject, a business decision may include changing the supplier's manufactured quantity of the transactional subject to meet demand data or forecast data of the customer. In another embodiment, the supplier may adjust a supply of the transactional subject on a regular basis to fulfill a firm-demand derived from the demand-indicating data for one or more customers.

Figure 5:
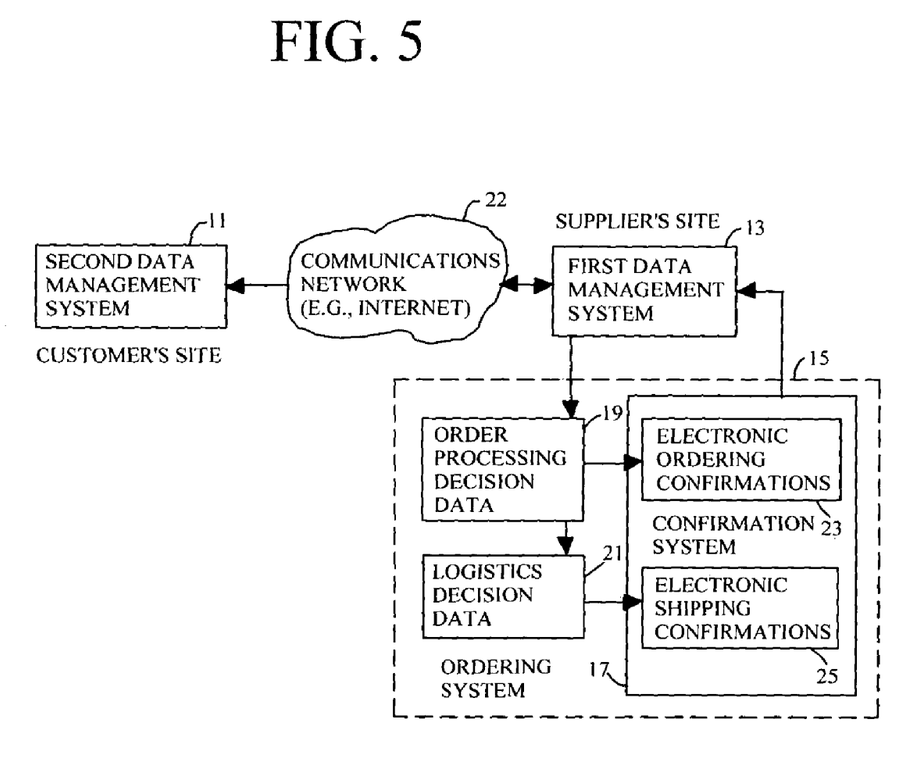
FIG. 5 is a block diagram of yet another embodiment of the planning system in accordance with the invention.

The generation of an illustrative business decision is further shown by FIG. 5, which is a block diagram of a business planning system in accordance with the invention. The configuration of FIG. 5 is similar to the configuration of FIG. 1 except FIG. 5 further includes an ordering system 15 coupled to the first data management system 11 at the supplier's site. Like reference numerals in FIG. 5 and FIG. 1 indicate like elements.

The ordering system 15 comprises a computer programmed with software instructions for making one or more of the following business decisions: an order processing decision 19, a logistics decision 21, an electronic order confirmation 23, and an electronic shipping confirmation 25. In a preferred embodiment, the ordering system 15 processes the foregoing business decisions on an automated basis with minimal or no human intervention.

The ordering system 15 may automatically execute one or more order processing decisions and logistics decisions based on the demand-indicating data to minimize potential delay and errors from human intervention. For example, the ordering system 15 may be programmed to first fill orders based on the earliest received demand-indicating data received from the first data management system 11 at the customer's site. Further, the ordering system 15 may be programmed to assign other priorities to orders based upon different times of receipt of the demand-indicating data. If the supplier has multiple orders from multiple customers, the supplier may assign priorities to the order execution based on customer identity, the size of the order, contractual commitments, or otherwise.

The logistics decision is based on the input of order processing decision data 19 and logistics data. Logistics data refers to shipping parameters, manufacturing parameters, lead times, or other information associated with order fulfillment. The first data management system 11 at the supplier's site may provide logistics data or such logistics data may be provided by a user entering information into a user interface 24 associated with the ordering system 15. For example, the ordering system may select the least cost shipper for an order as a logistics decision 21 based on recent cost estimates from freight forwarders or other logistics data.

In an alternate embodiment, the ordering system 15 may prompt a user for validation of order processing decision data 19 or logistics decision data 21 prior to executing the decision. For example, a user may access the ordering system 15 via a user interface 24 coupled to the first data management system 11 at the supplier's site or the customer's site.

The order processing decision data 19 and the logistic decision data 21 is provided as input to a confirmation system 17. The confirmation system 17 generates a status message that includes an electronic ordering confirmation 23, a shipping confirmation 25, or both. The confirmation system 17 sends the status message to the second data management system 13 at the supplier's site for forwarding to the first data management system 11 at the customer's site via the communications network 22. The status message provides information on the order processing decision data 19 or the logistic decision data 21, which is appropriate for sharing with the first data management system 11 of the customer.

The first data management system 11, the second data management system 13, or the ordering system 15 includes a user interface 24, such as a graphical user interface 24. The user interface 24 is adapted to present one or more of the following: order processing decision data 19, logistics decision data 21, an electronic order confirmation 23, and an electronic shipping confirmation 25. Accordingly, the customer and the supplier are kept updated in a contemporaneous manner and share some identical transactional information, which may be used to improve efficiency in the business relationship. The customer and the supplier may compare information and readily resolve discrepancies by accessing information via the user interface 24.

Figure 6:
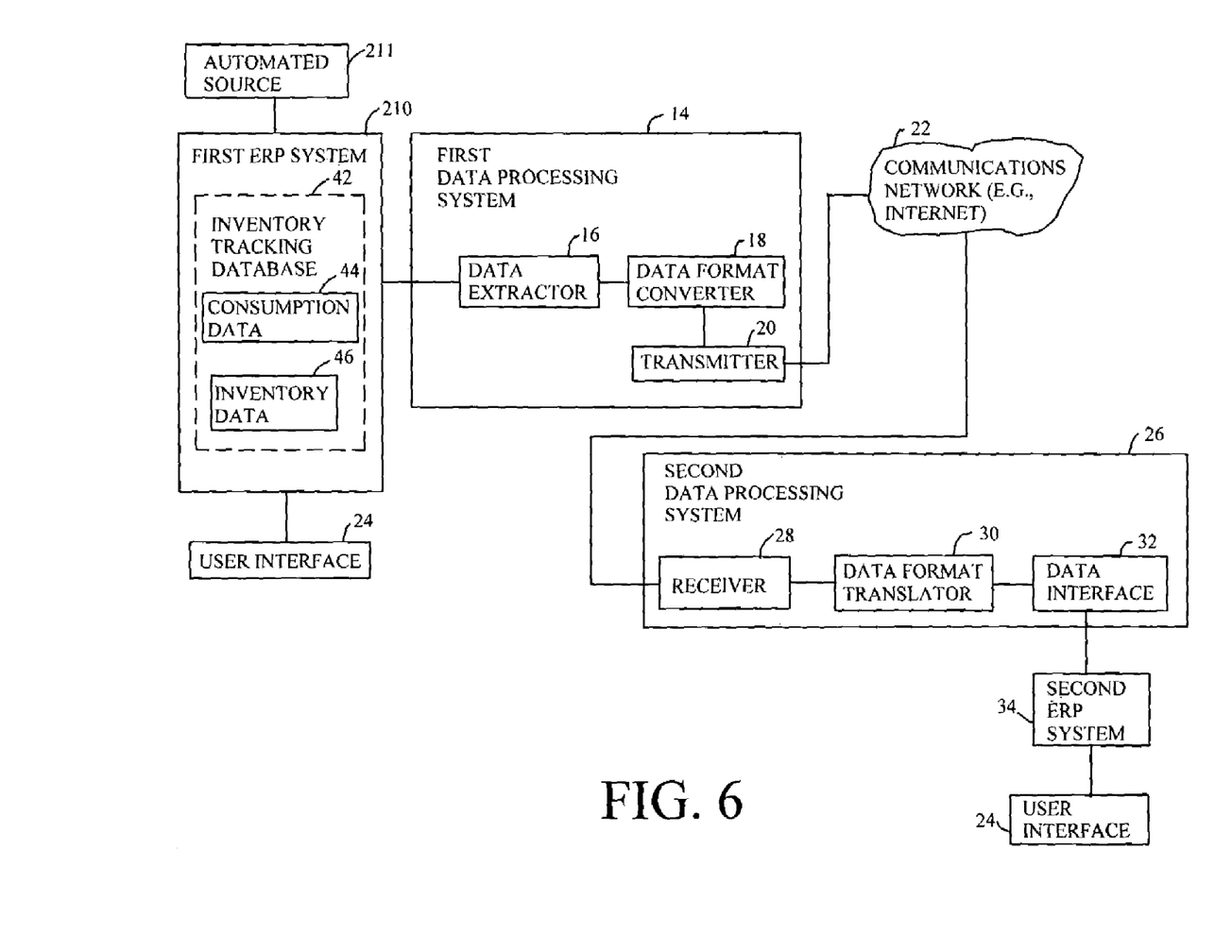
FIG. 6 is a block diagram of still another embodiment of a system for business planning in accordance with the invention.

FIG. 6 shows a block diagram of a system for business planning that is similar to the block diagram of FIG. 1, except FIG. 6 replaces the requirement-indicating database 12 of FIG. 1 with an inventory-tracking database 42 in a first ERP system 210. The inventory-tracking database 42 represents one example of the requirement-indicating database 12.

The inventory-tracking database 42 includes consumption data 44, inventory data 46, or both. The consumption data 44 represents a consumption measure or usage rate of an inventory of a particular good, material, service, product, or another transactional subject of the first business entity that is provided by the second business entity. For example, the consumption data 44 may represent an increase or decrease in the quantity of a transactional subject with reference to a previous reference measurement of the quantity of the transactional subject.

The inventory data 46 preferably includes quantity data and a product identifier for the particular good, material, service, product, or another transactional subject. The quantity data refers to the quantity or amount of measured inventory of the first business entity. For each distinct transactional subject, the quantity data is preferably associated with a corresponding product identifier. The measured inventory may be stored at the first site of the first business entity, or even at a second site of the second business entity on behalf of the first business entity.

The consumption data 44, the inventory data 46, or both may be provided by an automated source 211, which feeds data into the first ERP system 10. One example of an automated source 211 may represent a barcode scanning system that scans incoming shipments and registers the incoming shipments in an inventory database while subtracting outgoing shipment from the inventory data.

Figure 7:
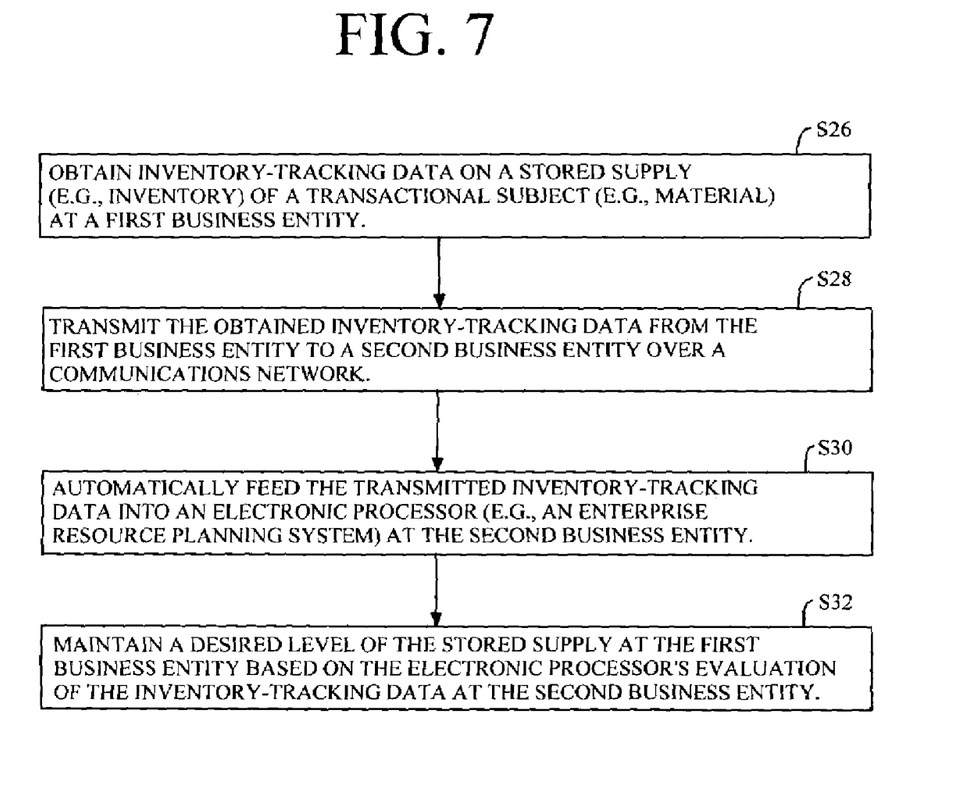
FIG. 7 is a flow chart of a method for business planning consistent with FIG. 6.

FIG. 7 shows a method of business planning which is consistent with the system of FIG. 6. The method of FIG. 7 starts in step S26. In step S26, the first data processing system 14 obtains inventory-tracking data on a stored supply (e.g., inventory) of a transactional subject (e.g. materials) at a first business entity.

In step S28, following step S26, the first data processing system 14 automatically transmits the obtained inventory-tracking data from the first business entity to a second business entity over a communications network 22. The first data processing system 14 transmits the extracted inventory-tracking data from the inventory-tracking database 42. The extracted inventory-tracking data may include extracted inventory data, extracted consumption data, or both. The extracted inventory-tracking data generally represents some subset of the inventory-tracking data in the inventory-tracking database 42. The extracted inventory-tracking data is loaded into the first data processing system 14. The extracted consumption data 44, the extracted inventory data 46, or both are transmitted over the communications network 22 from the first data processing system 14 to the second data processing system 26.

In step S30 after step S28, the second data processing system 26 automatically feeds the transmitted inventory-tracking data into an electronic processor, such as a second ERP system 34. The electronic processor is associated with the second business entity.

In step S32, the second ERP system 34 or the electronic data processor of the second business entity maintains a desired level of the stored supply at the first business entity based on the evaluation of the inventory-tracking data. For example, the second ERP system 34 may cooperate with an ordering system 15 to generate orders and shipments of the transactional subject to maintain a desired level. The method may display the inventory-indicating data for a user affiliated with one of the first business entity and the second business entity. The desired level may be determined based on an average historical level of the stored supply. For example, the desired level may be determined based on an average level of the stored supply for a time period prior to a subsequent time period for the desired level.

Although the desired level is preferably maintained through additional shipments from the second business entity to the first business entity, in an alternative embodiment, the second ERP system 34 may maintain the desired level by issuing return authorizations that allow the first business entity to reduce inventory to comply with the desired level.

The foregoing description of the method and system describes several illustrative examples of the invention. Modifications of alternative arrangements and variations of these illustrative examples are possible and may fall within the scope of the invention. Accordingly, the following claims should be accorded the reasonably broadest interpretation, which is consistent with the specification disclosed herein and not unduly limited by aspects of the preferred embodiments disclosed herein.

The invention claimed is:

1. A method for planning a business decision, the method comprising:
   obtaining requirement-indicating data of a first entity with respect to a transactional subject, wherein the obtaining comprises extracting a subset of the requirement-indicating data from a requirement-indicating database associated with an enterprise resource planning system, wherein the extracting process is based on a process based on previous history of usefulness of prior extracted data;

automatically transmitting the obtained requirement-indicating data from a first business entity to a second business entity over a communications network;

automatically feeding the transmitted requirement-indicating data into an electronic processor for monitoring the transactional subject, the electronic processor being associated with an electronic processing system of the second business entity; and generating a business decision of the first business entity and the second business entity that is based on the requirement-indicating data and that is made solely by the electronic processing system without the need for manual data entry into or manual data extraction from the electronic processing system.

2. The method according to claim 1 wherein the obtaining comprises obtaining demand-indicating data, the demand-indicating data including at least one of demand data and forecast data on the transactional subject.

3. The method according to claim 1 wherein the obtaining comprises obtaining inventory-tracking data, the inventory-tracking data including at least one of consumption data and inventory data.

4. The method according to claim 1 wherein the generating comprises generating an order as the business decision, the order being for the transactional subject based on the requirement-indicating data.

5. The method according to claim 1 wherein the generating comprises generating a shipping instruction as the business decision, the shipping instruction being for the transactional subject based on the requirement indicating data.

6. The method according to claim 1 wherein the transmitting comprises transmitting superseding requirement-indicating data on an as-needed basis to replace prior requirement-indicating data at the second business entity.

7. The method according to claim 1 wherein the transmitting comprises transmitting differential data for expressing a change with respect to prior requirement indicating data at the second business entity.

8. The method according to claim 1 wherein the generating comprises generating the business decision on production of the transactional subject based on an exchange of the requirement-indicating data at a regular interval, the regular interval having a duration that depends upon a nature of the business of the first business entity and the second business entity.

9. The method according to claim 1 wherein the business decision comprises an order processing decision.

10. The method according to claim 9 wherein the order processing decision comprises procuring a production material for either said first business entity or said second business entity.

11. The method according to claim 1 wherein the business decision comprises engaging in a commercial transaction involving the transactional subject.

12. The method according to claim 11 wherein the commercial transaction comprises purchase of the transactional subject.

13. A method for planning a business decision, the method comprising:

obtaining requirement-indicating data of a first entity with respect to a transactional subject, wherein the obtaining comprises extracting a subset of the requirement-indicating data from a requirement-indicating database associated with an enterprise resource planning system, wherein the extracting process is based on a process based on a model for managing the transactional subject;

automatically transmitting the obtained requirement-indicating data from a first business entity to a second business entity over a communications network;

automatically feeding the transmitted requirement-indicating data into an electronic processor for monitoring the transactional subject, the electronic processor being associated with an electronic processing system of the second business entity; and generating a business decision of the first business entity and the second business entity that is based on the requirement-indicating data and that is made solely by the electronic processing system without the need for manual data entry into or manual data extraction from the electronic processing system.

14. The method according to claim 13 wherein the obtaining comprises obtaining demand-indicating data, the demand-indicating data including at least one of demand data and forecast data on the transactional subject.

15. The method according to claim 13 wherein the obtaining comprises obtaining inventory-tracking data, the inventory-tracking data including at least one of consumption data and inventory data.

16. The method according to claim 13 wherein the generating comprises generating an order as the business decision, the order being for the transactional subject based on the requirement-indicating data.

17. The method according to claim 13 wherein the generating comprises generating a shipping instruction as the business decision, the shipping instruction being for the transactional subject based on the requirement indicating data.

18. The method according to claim 13 wherein the transmitting comprises transmitting superseding requirement-indicating data on an as-needed basis to replace prior requirement-indicating data at the second business entity.

19. The method according to claim 13 wherein the transmitting comprises transmitting differential data for expressing a change with respect to prior requirement indicating data at the second business entity.

20. The method according to claim 13 wherein the generating comprises generating the business decision on production of the transactional subject based on an exchange of the requirement-indicating data at a regular interval, the regular interval having a duration that depends upon a nature of the business of the first business entity and the second business entity.

21. The method according to claim 13 wherein the business decision comprises an order processing decision.

22. The method according to claim 21 wherein the order processing decision comprises procuring a production material for either said first business entity or said second business entity.

23. The method according to claim 13 wherein the business decision comprises engaging in a commercial transaction involving the transactional subject.

24. The method according to claim 23 wherein the commercial transaction comprises purchase of the transactional subject.

25. A method for planning a business decision, the method comprising:

obtaining demand-indicating data with respect to a transactional subject, wherein the obtaining comprises:

extracting a relevant portion of the demand-indicating data from a database, wherein the extracting process is based on a process based on previous history of usefulness of prior extracted data; and formatting the extracted relevant portion of the demand-indicating data into an extensible mark-up language document;

automatically transmitting the extracted relevant portion of the demand-indicating data from a first business entity to a second business entity over a communications network;

automatically feeding the transmitted demand-indicating data into an electronic processor for tracking the demand-indicating data, the electronic processor being associated with an electronic processing system of the second business entity; and generating a business decision of at least one of the first business entity and the second business entity that is based on the demand-indicating data and that is made solely by the electronic processing system without the need for manual data entry into or manual data extraction from the electronic data processing system.

26. The method according to claim 25 wherein the transmitting comprises transmitting the extensible mark-up language document as the demand indicating data over the communications network.

27. The method according to claim 26 further comprising:
receiving the transmitted extensible mark-up language document; and
translating the extensible mark-up language document into a data format compatible with an enterprise planning resource system.

28. The method according to claim 25 further comprising displaying the demand-indicating data for a user affiliated with one of the first business entity and the second business entity.

29. The method according to claim 25 wherein the business decision comprises deciding to change the manufactured quantity of a material as the transactional subject.

30. The method according to claim 25 wherein the business decision comprises deciding to change a supply of material to fulfill a firm demand derived from the demand-indicating data.

31. The method according to claim 25 wherein the obtaining includes obtaining one of demand data and forecast data with respect to the transactional subject.

32. The method according to claim 25 wherein the first business entity represents a customer of a material as the transactional subject and wherein the second business entity represents a supplier of the material.

33. A method for planning a business decision, the method comprising:
obtaining demand-indicating data with respect to a transactional subject, wherein the obtaining comprises:
extracting a relevant portion of the demand-indicating data from a database, wherein the extracting process is based on a process based on a model for managing the transactional subject; and
formatting the extracted relevant portion of the demand-indicating data into an extensible mark-up language document;

automatically transmitting the extracted relevant portion of the demand-indicating data from a first business entity to a second business entity over a communications network;

automatically feeding the transmitted demand-indicating data into an electronic processor for tracking the demand-indicating data, the electronic processor being associated with an electronic processing system of the second business entity; and generating a business decision of at least one of the first business entity and the second business entity that is based on the demand-indicating data and that is made solely by the electronic processing system without the need for manual data entry into or manual data extraction from the electronic data processing system.

34. The method according to claim 33 wherein the transmitting comprises transmitting the extensible mark-up language document as the demand indicating data over the communications network.

35. The method according to claim 34 further comprising:
receiving the transmitted extensible mark-up language document; and
translating the extensible mark-up language document into a data format compatible with an enterprise planning resource system.

36. The method according to claim 33 further comprising displaying the demand-indicating data for a user affiliated with one of the first business entity and the second business entity.

37. The method according to claim 33 wherein the business decision comprises deciding to change the manufactured quantity of a material as the transactional subject.

38. The method according to claim 33 wherein the business decision comprises deciding to change a supply of material to fulfill a firm demand derived from the demand-indicating data.

39. The method according to claim 33 wherein the obtaining includes obtaining one of demand data and forecast data with respect to the transactional subject.

40. The method according to claim 33 wherein the first business entity represents a customer of a material as the transactional subject and wherein the second business entity represents a supplier of the material.

* * * * *